United States Patent [19]

Fay, III et al.

[11] Patent Number: 4,810,256
[45] Date of Patent: Mar. 7, 1989

[54] COMPOSITE FUEL ARTICLE

[75] Inventors: James E. Fay, III; James Olszewski, both of Winnebago County, Wis.

[73] Assignee: Kimberly-Clark Corporation, Neenah, Wis.

[21] Appl. No.: 175,650

[22] Filed: Mar. 21, 1988

Related U.S. Application Data

[63] Continuation of Ser. No. 3,666, Jan. 15, 1987, abandoned.

[51] Int. Cl.$^4$ .......................... C10L 5/00; C10L 11/06
[52] U.S. Cl. .......................................... 44/14; 44/534; 44/541; 44/543; 44/544
[58] Field of Search ................. 44/14, 34, 38, 41, 534, 44/541, 543, 544

[56] References Cited

U.S. PATENT DOCUMENTS

| | | | |
|---|---|---|---|
| 694,027 | 2/1902 | Pollard | 44/38 |
| 2,816,013 | 12/1957 | Powell | 44/41 |
| 2,854,321 | 9/1958 | Stanton | 44/41 |
| 2,948,594 | 8/1960 | Doyle | 44/534 |
| 3,337,312 | 8/1967 | Parkes | 44/6 |
| 3,356,469 | 12/1967 | Stephenson et al. | 44/41 |
| 3,527,580 | 9/1970 | Bonlie | 44/543 |
| 3,726,650 | 4/1973 | Ronden | 44/14 |
| 3,726,652 | 4/1973 | Schick | 44/14 |
| 4,043,765 | 8/1977 | Tanner | 44/14 |
| 4,104,034 | 8/1978 | Wu | 44/41 |
| 4,243,394 | 1/1981 | Kincaid | 44/14 |

FOREIGN PATENT DOCUMENTS

| | | | |
|---|---|---|---|
| 364880 | 12/1922 | Fed. Rep. of Germany | 44/14 |
| 10371 | of 1887 | United Kingdom | 44/34 C |
| 4834 | of 1891 | United Kingdom | 44/34 C |

Primary Examiner—Carl F. Dees
Attorney, Agent, or Firm—Donald L. Traut

[57] ABSTRACT

Fuel articles having a covering layer thereover, wherein the covering layer serves as an ignition material for the underlying fuel element, and may be spaced from the underlying fuel element. Preferred fuel articles have charcoal compositions in the underlying fuel element and the covering layer is fibrous. The covering layer may be spaced from the fuel element by means of bridging concavities in the fuel element itself, by providing intermediate spacing elements within a concavity of the fuel element, or by providing a spacing material between the fuel element and the covering layer, not necessarily at a location of concavity in the fuel element. The covering layer may have a variety of compositions, and may be overlain by one or more additional layers. The invention further provides methods of manufacturing the fuel articles disclosed as well as methods of using them.

41 Claims, 2 Drawing Sheets

COMPOSITE FUEL ARTICLE

This application is a continuation of application Ser. No. 003,666 filed Jan. 15, 1987, now abandoned.

BACKGROUND OF THE INVENTION

This invention pertains to manufactured fuel articles, and particularly charcoal fuel articles, most commonly known as charcoal briquettes. The invention pertains particularly to an improved igniting charcoal for cooking.

Charcoal is conventionally available as pillow-shaped briquettes. It finds substantial use by consumers for cooking food, and commonly is used for cooking relatively smaller amounts of food, as for a family meal. In this type of use it is normal to light a separate batch of charcoal for each use. The process of lighting the charcoal is thus a rather significant event in the overall use of the charcoal; and the ease of ignition therefore becomes significant. The normal method of igniting conventional charcoal is to apply a lighter fluid from a separate container to the charcoal just before ignition. The lighter fluid is absorbed by the charcoal. When an appropriate amount of fluid has been absorbed, the charcoal, containing the fluid, may be ignited using an ordinary match. While the heat from the match flame is not sufficient to ignite the charcoal, it is sufficient to ignite the lighter fluid; and it does. As the lighter fluid burns, it generates heat which is transmitted to the charcoal. The temperature of the charcoal rises, and eventually reaches a temperature sufficiently high for ignition of the charcoal. Desirably, the charcoal is sufficiently ignited by the time the lighter fluid has been totally consumed, so that the burn continues, with the burning charcoal providing essentially all of the fuel for the sustained burn, during which sustained burn the food is normally cooked.

As an alternate method of igniting charcoal, there is a commercially available product wherein lighter fluid is impregnated into the charcoal briquettes at the point of manufacture. This product has a disadvantage that it must be packaged in a vapor barrier type packaging material in order to prevent escape of the lighter fluid during the distribution and retailing operation, up to the point of consumption of the product. When the package is opened, the volatile lighter fluid is susceptible to escaping through the open package over a period of time, where only a portion of the entire package contents is used at the time the package is opened. Such escapement reduces the amount of lighter fluid in the briquettes, reducing, if not eliminating, the functional benefits of impregnating the briquettes with lighter fluid. Another problem with factory impregnated charcoal is that the lighter fluid is distributed more or less evenly throughout the mass of the charcoal briquette. As such, whatever amount of lighter fluid is in the briquette at the time of use continues to evolve from the briquette throughout a substantial portion of the burn phase of the briquette. This includes evolution of lighter fluid and combustion products from lighter fluid substantially throughout the period when food is being cooked. This exposes the food to lighter fluid or combustion products therefrom which may be detrimental. Further, lighter fluid burned during the burn phase is superfluous and wasteful with respect to its primary ignition function. By contrast, when lighter fluid is added to the briquettes immediately prior to ignition, it is anticipated that the lighter fluid is localized in the exterior regions of the briquette, and is substantially burned off by the time the sustained burn phase is reached, wherein the charcoal itself is burning over a majority of its surface.

Another problem with conventional charcoal is that it is dirty. When charcoal is handled, the user typically gets dirty hands. Where lighter fluid is handled, the user may get lighter fluid on the hands, or a combination of lighter fluid and charcoal bits, which is even more difficult to remove. With the lighter fluid typically being a petroleum-based substance, it is somewhat difficult to remove with ordinary soap and water, making the cleanup more difficult; with the consequence that the user may not take the time or effort to completely remove particularly the lighter fluid from his hands. Thus, the contaminated hands may further contaminate food as it is being cooked over the charcoal or as it is being otherwise prepared or consumed.

It is an object of this invention to provide a novel manufactured fuel article, having improved ignition characteristics.

It is a more specific object to provide a manufactured fuel article having an outer combustible layer which acts, in combination, as an igniter material, a cushioning material, and as a spacing layer to minimize direct contact with the charcoal and thereby reduce the amount of soil which reaches the user's hands.

It is yet another object to provide the outer layer in such a composition, amount, and configuration that it ignites easily and is essentially totally consumed by the time the primary fuel element is substantially ignited.

It is yet another object of the invention to provide a composition for the outer layer such that it burns in essentially the solid phase.

It is still another object of the invention to provide a spacing between the fuel element and the outer layer such that the heat generated by the outer layer is transferred to the fuel element material only to the extent it is capable of traversing the space.

It is yet another object of the invention to provide novel methods of making a fuel article.

It is still another object of the invention to provide novel methods of igniting a fuel article.

SUMMARY OF THE INVENTION

Some of the objects of the invention are obtained in a composite fuel article which has a solid fuel element and a covering layer of a solid phase igniter material over the fuel element. It is preferred that the solid phase igniter material cover substantially all portions of the fuel element, and it is desirable that it substantially enclose the fuel element. In preferred embodiments, the covering layer comprises fibrous material. In preferred embodiments, the covering layer has portions spaced from the fuel element. In some embodiments the spacing is provided by concavity on the surface of the fuel element.

Concavity on the fuel element is preferred. It is also preferred that at least a portion of the covering material be made of fibers capable of bridging the concavity. That capability is best used where the fibers do bridge the concavity.

In some embodiments it is preferred that the fibrous material comprise a combination of long fiber and short fiber. In some embodiments the fibrous materials comprise a combination of long fiber capable of bridging the concavity and short fibers incapable of bridging the concavity. Certain embodiments include a lesser density spacing zone of fibers disposed between the fuel element and the covering layer. In these embodiments the covering layer comprises a higher density zone than the spacing zone and is spaced from the fuel element by the spacing zone. Fibers in the spacing zone may be primarily short fibers.

In many embodiments of the invention, it is preferred that the solid phase igniter material comprise a polyester composition, or a nitrocellulose composition, with other polymer compositions being less preferred. The composition of the covering layer may comprise wax.

Of the fibers used in the covering layer, the long fibers are typically derived from mineral sources, such as petroleum, and the shorter fibers are typically derived from plant or animal sources, most typically from wood.

The invention may also be characterized as comprising an inner core of a solid shaped charcoal fuel element and a covering layer of a fibrous material comprising synthetic polymer. The synthetic polymer may be fibrous as described hereinabove, and may include short fibers, typically derived from plant or animal sources.

The invention further comprises a method of making a fuel article. The method comprises the steps of fabricating a solid fuel element and fabricating, on the fuel element, a covering layer of a fibrous material which may comprise synthetic polymer.

In some embodiments the method comprises the step of fabricating the covering layer with a combination of longer synthetic polymer fibers and shorter fibers.

In some embodiments, fabricating the covering layer comprises a plurality of applications of fibrous materials.

Also, in some embodiments the method comprises applying spacing means to the outside surface of the fuel element and then applying the covering layer of a fibrous material to the fuel element and over the spacing means.

The method may include the step of applying wax at the covering layer.

The invention further includes novel methods of igniting fuel articles. The novel methods of igniting the fuel articles begin with fabrication of the fuel article. The first step is fabricating a solid fuel element. The second step is fabricating, on the fuel element, a covering layer of a fibrous material comprising synthetic polymer. The third step is igniting the covering layer, as with a match. The ignited covering layer burns, producing sufficient heat to ignite the solid fuel element. In the preferred embodiments of the method of igniting the fuel article, the method includes providing spacing between the fuel element and the covering layer. It may also include applying wax at the covering layer before igniting the covering layer.

DETAILED DESCRIPTION OF THE ILLUSTRATED EMBODIMENTS

Figure 1:
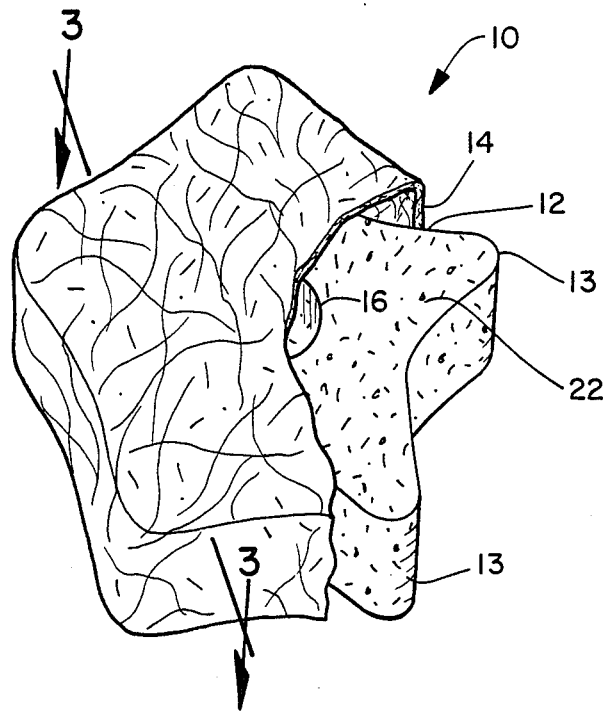
FIG. 1 is a pictorial view of a composite fuel article of the invention with part of the covering layer cut away.

Referring now to FIG. 1, the fuel article of the invention 10 is comprised of the fuel element 12 and a covering layer 14. The fuel element 12 is in the general shape of a star having a plurality of fingers projecting from a central body portion and terminating at finger ends 13. Fuel element 12 further comprises a hole 16.

Figure 2:
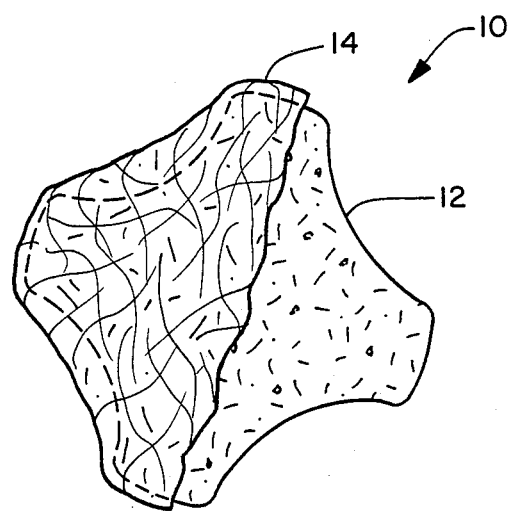
FIG. 2 is a top view of a fuel article of the invention and showing an alternate shape, and with part of the covering layer cut away.

FIG. 2 shows the top view of a fuel article of the invention which illustrates a second shape for fuel articles of the invention. It is seen that the overall shape of the article is more or less determined by the shape of the fuel element 12 in both FIGS. 1 and 2. In FIG. 2, the outline of the fuel element 12 is shown in dashed representation to indicate that covering 14 is spaced from the fuel element 12 in the locations of concavity of the fuel element 12.

Figure 3:
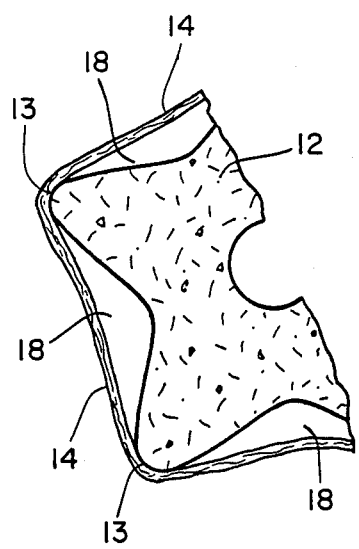
FIG. 3 is a cross-section of the fuel article of the invention taken at 3—3 of FIG. 1; and showing the spacing between the concavity of the fuel element and the covering layer.
Figure 4:
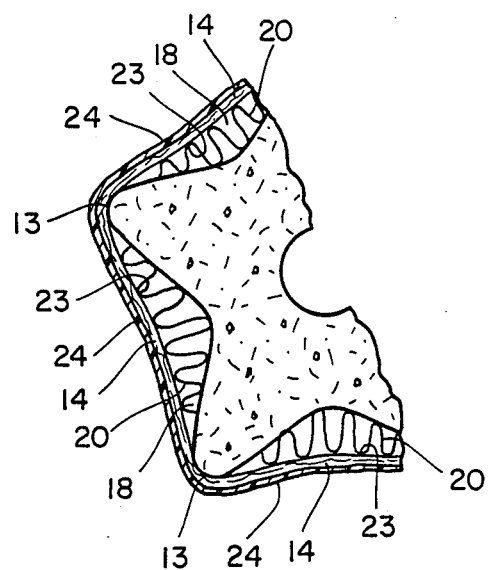
FIG. 4 is a cross-section as in FIG. 3 and shows, in addition, both a low density spacing material between the covering layer and the fuel element and a layer of wax over the covering layer.

FIG. 3 shows, in cross-section, the space 18 between covering layer 14 and the fuel element 12 at the areas of concavity between the finger ends 13. In FIG. 4, spacing elements 20 occupy the spaces 18 between the covering layer 14 and the fuel element 12 at the areas of concavity between finger ends 13. FIG. 4 also illustrates a layer of wax 24 over covering layer 14.

Figure 5:
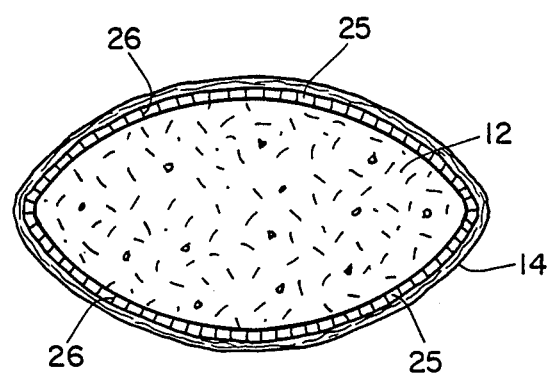
FIG. 5 shows a fuel article of the invention in the shape of a conventional pillow briquette, and including a low density spacing zone disposed between the fuel element and the higher density covering layer.

FIG. 5 shows the covering layer 14 applied over a conventional pillow-shaped charcoal briquette element 12. Layer 14 is spaced from fuel element 12 by low density spacing means 26 which defines a space 25 between element 12 and layer 14 which has a lower density occupation in terms of mass per unit volume than layer 14. Layer 14 is thus spaced from the fuel element 12 by the spacing means 26 which occupies the intervening space 25.

Referring now to fuel element 12, it is seen from the several illustrated embodiments that the shape of fuel element 12 is relatively unimportant with respect to the functionality of the invention, so long as a spacing between the fuel element 12 and covering layer 14 is maintained over at least part of the surface area of fuel element 12. The spacing can be maintained by means of the combination of concavity in the fuel element and bridging capability in the covering layer 14, as best seen in FIGS. 1 and 3. Maintenance of the spacing can also be obtained by means of the spacing material 20 used in combination with the concavity of the fuel element 12 and the bridging capability of materials in layer 14. It is contemplated that layer 14 is usually fabricated from a plurality of fibers. Where the fibers are relatively long, they may span the outer points of the fuel elements such as finger ends 13; thus forming a bridge completely of fiber, to generate space 18 in the area of concavity of the fuel element. Where the fibers in layer 14 may not be sufficiently long to bridge the entire length of the spacing zone 18 defined by the concavity, intervening spacing material 20 may be used between the layer 14 and the fuel element 12, particularly at the areas of concavity. Spacing elements 20 may be any of a plurality of materials so long as the spacing material 20 is of a relatively low bulk density, and preferably lower bulk density than layer 14. Where the depth of the space 18 to be filled by spacing material 20 is relatively shallow, short length fibers may, for example, be used. Where the depth of the space is greater, longer length fibers, or other spacing material is preferably used, providing that the bulk density of the spacing material is maintained at a low level with respect to the volume occupied.

Where no concavity exists in the fuel element 12, it is still important that at least portions of the covering layer 14 be spaced from the fuel element. As seen in FIG. 5, particularly in the absence of concavity, the spacing may be maintained by means of low density spacing material 26, such as short fibers, which may be flocked, for example, or otherwise placed onto the fuel element 12.

While spacing materials 20 and 26 are separately illustrated, 20 as used in a concavity and 26 used without concavity, it is contemplated that a wide variety of materials, with some overlapping of material groups, may be used for each application.

Fuel element 12 is contemplated as usually having a charcoal type composition. Other compositions are acceptable such as wood compositions or coal compositions. The composition of fuel element 12 is not particularly critical, so long as the burning of covering layer 14 is adequate to ignite the fuel element 12 enough to sustain continuation of the burning.

Understanding the formation and the use of covering layer 14 is critical to obtaining the maximum benefits from the invention, since covering layer 14 provides a plurality of advantageous characteristics which have hereinbefore not been obtained with a fuel article for similar use. The primary purpose of covering layer 14 is to provide a solid phase material which is readily ignited and which burns and thereby generates sufficient heat to ignite the fuel element 12. With respect particularly to charcoal fuel elements, the covering layer 14 is intended to replace the lighter fluid which is commonly used with conventional charcoal. By being a solid phase material, covering layer 14 burns in a relatively fixed location adjacent the fuel element 12, rather than first vaporizing, and then burning in a transient, and usually more distant location as is done by liquid lighter fluid; whereby the burning vapors are at an uncontrolled distance from the fuel element 12; and whereby a substantial fraction of the heat generated in burning the vapors is dissipated from a more distant burning location, rather than radiating from a location generally closer to the fuel element 12 as with covering layer 14. In like manner, air currents such as wind, more distant from the fuel elements, can readily blow combustible vapors of lighter fluid, to disadvantage, away from the fuel element 12 which the user is attempting to ignite. Thus, materials for layer 14 which exhibit the functional advantages of the invention have a vapor pressure at ambient conditions substantially below the vapor pressure of conventional lighter fluid, and are generally considered solids, and within that context, including plastics.

Cover layer 14 is preferably made of a fibrous polymeric material. While sheet type materials are acceptable for covering layer 14, in the preferred embodiments the covering layer is fibrous. Advantageously, the fibrous material can be made as by a conventional meltblowing process, whereby a substantially continuous stream of endless fiber is extruded through a narrow die, forming a strand, as is done in the formation of non-woven products. A conventional hand held applicator gun can be used to direct the strands of melt blown fiber as they exit the die of the meltblowing equipment. By judiciously directing the fiber across the concavities between finger ends 13 of the fuel element 12, a substantial bridge suspension may be generated between each pair of ends 13. The spacing between the strands can readily be filled in by applying fibers in a random fashion, and/or in a variety of lengths and configurations, to the basic bridge formation, as well as to the top surface 22 of the fuel element and the corresponding bottom surface. At the same time, the concavity of hole 16 is spanned as a part of forming layer 14 on the top surface of the fuel element. The thickness of layer 14 as applied in this manner can be controlled according to the quantity of fibers deposited and their distribution. It is preferred that the material of layer 14 be substantially evenly distributed over the fuel article 10. Uneven distribution may be desired for some applications. The thickness of layer 14, when applied as a continuous filament, may be controlled by the rate of application and the time during which it is being applied. While it is preferred that the fibers of layer 14 be generated at the time layer 14 is being applied to the fuel element 12, and while it is preferred that it be formed in a meltblown or spunbonding type process, other processes may be used, including the formation of layer 14 separately and then its subsequent attachment to the fuel element 12 to form article 10. It is preferred that layer 14 contain a substantial quantity of elongated fibers in order to facilitate the bridging effect. Preferred composition of the elongated fibers is polymeric; with particularly preferred polymers being thermoplastic. Illustrative of specific polymers are the polyolefins, olefin copolymers, polyesters such as polyethylene terephthalate, and amide polymers. The particular polymer may be selected according to a plurality of parameters. One parameter is cost. Another parameter is ease of processing to form the desired layer 14. Still another parameter is the heat generated by the particular material as it burns during the ignition phase of the fuel article. With respect to these considerations, the most preferred polymer is a polyester.

A particularly critical component of the invention is recognition that the covering layer 14 must at some locations in the fuel article be spaced from fuel element 12. This is accomplished in the embodiments illustrated in FIGS. 1 and 3 by providing fibers in layer 14 sufficiently long and in an appropriate direction that they provide an effective bridge between each of the pairs of finger ends 13, so that the concavity between the finger ends 13 is preserved as space 18. Additional concavity is represented in a hole as at 16, which may project partially, or completely, through the fuel element. Another way of obtaining the spacing between layer 14 and fuel element 12 is to provide some lower density fill material between fuel element 12 and layer 14. This is represented as a light corrugation in FIG. 4, which could be any of a number of materials in virtually any form that provides spacing between the fuel element 12 and layer 14. The spacing material 20 could be a corrugated material as shown, elongated fibers in low density, a low density foam, or any other low bulk density material which provides the appropriate spacing. In any event, there are usually spaces between the elements of the spacing material 20, including at locations proximate covering layer 14, as seen in FIG. 4. The spacing is provided in FIG. 5 without the benefit of a concavity in fuel element 12. Rather, in the embodiment of FIG. 5, the spacing is provided by a lower density material 26 which holds the material of layer 14 spaced a short distance away from the fuel element 12. In order for material 26 to properly hold layer 14 spaced from fuel element 12, it is significant that there be cooperation between spacing material 26 and the material in layer 14, with respect to the material in layer 14 not intruding inappropriately into the space defined by the spacing material 26. An exemplary method of providing the necessary spacing as in FIG. 5 is by flocking fuel element 12 in a conventional flocking process, which leaves the plurality of short fibers arranged generally perpendicularly with respect to fuel element 12. The material layer 14 may then be applied to the flock with minimal pressure, and with optional inclusion of an adhesive, such that the stiffness of the short fibers 26 is preserved, thus maintaining the spacing between fuel element 12 and layer 14. While the amount of covering layer which is spaced from the fuel element 12 is not especially critical, it is preferred that at least 20%, preferably at least 40% of that portion of the covering layer which overlies the fuel element, including any holes, be spaced from the fuel element.

The purpose of maintaining the space between the fuel element 12 and covering layer 14 is to provide, for the igniter material in layer 14, the capability to generate a significant amount of heat, as it begins to burn, to promote a self-sustaining generation of heat, initially growing in intensity without having that heat dissipated immediately into fuel element 12. While it is seen hereinabove that the purpose of igniting layer 14 is to generate heat for subsequent ignition of fuel element 12, it is important that the heat available to support ignition and burning of layer 14 be established first. In support of that series of priorities, whereby heat is preferentially generated and used at layer 14 to support its ignition and burning, and excess heat is subsequently transferred from layer 14 to fuel element 12, it is important that the accumulation of heat in layer 14 be given priority in order to ensure adequate generation of heat for transfer to fuel element 12. In prior art fuel articles having covering layers thereon, the covering layers were in direct contact with the fuel element, such that heat generated by the covering layer was immediately subject to being drawn off by the fuel element, which acted much like a heat sink, thereby cooling the covering layer. Thus it is critical that the spacing between fuel element 12 and covering layer 14 be maintained at a low density; and where any spacing material is used, it has a low bulk density. The bulk density should be less than 10 lbs./ft.$^3$, preferably less than 5 lbs./ft.$^3$, most preferably less than 2 lbs./ft.$^3$.

In some embodiments, covering layer 14 may have a low bulk density, namely less than 10 lbs./ft.$^3$, which is within the bulk density range of the spacing material. In those embodiments, it is satisfactory for the spacing material (i.e. 20) and the covering layer 14 to have the same composition, chemically and physically, and for spacing material 20 and covering layer 14 to comprise a single layer which may have a uniform bulk density across its thickness.

It is important that, in covering layer 14, the composition, the structure, and the positioning with respect to fuel element 12, in combination, result in covering layer 14 being more easily ignited than fuel element 12, to the extent that it reaches a self-sustaining burn, and ignites fuel element 12 to a self-sustaining burn, by the time it is all consumed. It is entirely satisfactory that these ignition properties be measured during ignition of a random stack of the fuel articles as would be used for cooking food on a standard 22 inch charcoal cooker, such as manufactured by Weber-Stephen Products Company of Palatine, Ill. It is particularly seen that the structure of layer 14 is primarily thin in cross-section, compared to the generally thicker cross-section of fuel element 12.

Another benefit of the covering layer 14 is seen with respect to the handling of the fuel articles. Conventional charcoal fuel articles, having no covering layer corresponding to layer 14, are typically subject to substantial breakage and crumbling by the time of the completion of the manufacturing process, wherein the moisture content is of the order of 5% more or less. At these low moisture contents, and particularly with respect to the commonly used pillow-shaped briquettes, edges of the fuel article are particularly friable, crumbly, and otherwise easily fractured. During handling in the manufacturing plant, during shipping, and at the point of use, there is a continuing tendency of the fuel articles to breakage, and crumbling of small particles of material from the fuel articles as the result of the various shocks in the overall handling process. While conventional pillow-shaped fuel articles are not particularly subject to breakage across the entire thickness of the fuel article as a whole, it is normal to have a significant accumulation of particles, dust, and the like in the package at the point of use of conventional charcoal. In the fuel articles of the invention, covering layer 14, as indicated earlier, is made preferably from a more or less mat type configuration of fibrous material. The general characteristic of such layer 14 is that it is soft and cushioning. Additionally, space 18 or 25, as it applies, further contributes to the cushioning effect, with or without spacing material. This soft, cushioning characteristic serves a functional purpose in the material handling in that it acts somewhat as a shock absorber between the fuel article and its outside environment. The result of such a cushioning action is that fuel articles of the invention experience substantially less breakage, crumbling, dusting and the like in the same environment of material handling, as compared to fuel articles having no covering layer 14.

A further benefit of the fuel articles of the invention, as covered by covering layer 14, is that the overall process of using fuel articles of the invention leaves the user substantially cleaner than the process of using conventional charcoal. This improved cleanliness is achieved in a plurality of contributory ways. First, as the user manipulates and arranges the fuel articles of the invention, even when using his hands, he is handling primarily the clean covering material of layer 14 which, if polymeric, leaves little if any residue on the user's hands. Secondly there is less breakage, and fewer small particles of fuel in the package, so that the dust which typically accompanies emptying a package of charcoal is generally reduced. Finally, by using the fuel articles of the invention, there is no longer any need for charcoal lighter fluid in that the burning characteristics of layer 14 provide the function of the igniter material. Thus is the user freed from purchasing the lighter fluid as a second fuel component, from the process of adding lighter fluid to the charcoal, and from the contamination of his hands by the lighter fluid. The contamination of the hands by the lighter fluid is a significant feature in that the same hands typically are used for cooking food. While ideally the user washes his hands after handling the lighter fluid, in practice not all users are particularly careful about following that procedure. As a result, it is not uncommon for the user's hands to contaminate the food, the utensils, and the like, particularly with lighter fluid, if his hands have not been carefully cleaned after using the lighter fluid and igniting the charcoal. This may present a health risk to the user, and to those who come in contact with the food so prepared.

It is contemplated that layer 14 may comprise a plurality of materials in its composition. The preferred materials are in the form of long fibers. Also contemplated is a combination of long fibers and short fibers such as wherein the short fibers occupy spaces between the long fibers. In this regard the long and short fibers may be applied concurrently or in subsequent applications. One particular arrangement contemplates a disposition of long fibers followed by a disposition of shorter fibers over the long fibers, with or without the accompanying use of a material which acts as an adhesive.

In the embodiment seen in FIG. 4 there is seen to be a corrugated type of spacing material 20 in concavity 18, which provides points of contact at 23 toward the outer portion of concavity 18. The points of contact 23 provide locations from which shorter bridges may be built, as compared to the span of a bridge across the entire span between finger ends 13. Thus with the use of spacing materials 20 which have spaced contact points 23, shorter fibers may be used for building the basic bridge structures between the contact points 23 than can be used when the spacing between finger ends 13 must be bridged without further support. It is thus seen that a variety of fiber lengths may be used to form the layer 14, as well as non-fibrous types of covering.

Further as seen in FIG. 4, there may be one or more layers of additional material covering cover layer 14. FIG. 4 shows a layer of wax 24 on the outside of layer 14. Such a layer may be applied by conventional processes, as by spray application, dipping, curtain, or the like. The application process, at least in part, determines the distribution of the wax layer with respect to layer 14. In some cases it is entirely possible that the wax layer may penetrate layer 14 and become a part thereof. With smaller applications of materials such as liquid wax, it is entirely possible that the wax, or the like, may become an intregal part of layer 14, and may or may not fill the void spaces in the fibrous mat of layer 14, whereby said covering layer 14, including the wax, may have void spaces providing gaseous communication between the spacing zone 18 and the outside environment. It is preferable that at least some fibrous components of layer 14 be proximate voids in the structure, or proximate the outer surface of the fuel articles. Yet further, it is contemplated that a liquidous or adhesive type material be used in, or on, layer 14. In some embodiments, it is desirable to add additional wick type materials into the liquid type layer while it is still in the fluid or plastic state. For example, fibers may be applied to a plastic or wet coating of wax. As desired, additional layers of material may be added to make the desired finished product. It is important, throughout the application of the several layers, if more than one layer is used, that the spacing be maintained between layer 14 and fuel element 12. It is particularly important that materials applied to layer 14 do not permeate through layer 14 and fill the space 18 between layer 14 and the fuel element 12. The general nature of the process of manufacturing fuel articles of the invention is to first fabricate the fuel element. The fuel element may be fabricated in a plastic state wherein its moisture content is on the order of 20% to 0% by weight, after which it is typically dried. The covering layer 14 may be fabricated separately and applied to the fuel article in such a manner as to bond it thereto, such as for example adhesively, or the covering layer 14 may be fabricated directly on the fuel article. The fabrication on the fuel article may be done anytime after the formation of the fuel article itself, whether in the moist state where it contains substantial quantity of water or in the dry state. Where shorter fibers are used in the fabrication of coating layer 14, they are typically derived from either animal or plant origin. Typical animals of origin are sheep and goats. Typical plants of origin are wood, bagasse, sugar cane, sugar beets, cotton, flax, and the like.

Fuel articles of the invention are used in a manner similar to conventional charcoal fuel articles, with the exception that no lighter fuel is added. The same amount, as measured by weight, of fuel articles of the invention is used as would be used for similar charcoal fuel articles not having the covering layer 14. As with conventional charcoal fuel articles, fuel articles of the invention are commonly arranged in a random stack for the ignition phase of the burn. Once the fuel articles are arranged in a random stack, the covering material of one or more of the articles may be ignited with a match. It is significant to note that no lighter fluid need be added to the fuel articles of the invention, and that the igniter material of covering layer 14 is essentially nonvolatile, so vapor impermeable packaging is unnecessary. The covering material 14 ignites readily and burns with sufficient heat to ignite the underlying fuel elements 12 in the stack. The quantity of covering material 14 used is that which will provide for satisfactory ignition of the fuel elements 12 by the time the covering material has been consumed by the fire. This quantity of material will vary according to the composition of the fuel which is used for fuel element 12. Where fuel element 12 is, for example, wood, a light covering layer 14 is satisfactory. Where the underlying fuel element 12 is charcoal, a heavier layer of covering material 14 is required. Finally for a fuel element 12 which has a substantiall high ignition temperature, such as a remanufactured coal composition, the layer 14 will be of a substantially greater thickness. There will also be a certain amount of deviation in the heat output depending upon which particular material, or materials, are used in the fabrication of layer 14. So a minor amount of experimentation will show the appropriate quantity of material to be included in layer 14 once the layer 14 composition has been determined. Similarly, if a particular thickness of layer 14 is desired, then the composition may be adjusted accordingly.

During the use of the fuel articles of the invention, and at the completion of the ignition phase, substantially all of layer 14 will have been consumed, and the underlying fuel element 12 will have been ignited. At this point, the fuel articles of the invention are used in the same manner in which they would be used if they had not had the covering layer 14 as taught herein. The conventional practice is to spread ignited fuel articles over substantially the entire surface of the combustion grate, or combustion pan, for the general burn phase of using the fuel articles. The heat output both in intensity and over the period of time is approximately the same as the heat output, according to the same measures, of similar fuel articles not having the covering layer 14.

Thus, it is seen that the invention provides novel and improved fuel articles for use primarily with cooking, but having a wide variety of applications, including fuel elements derived from wood, from charcoal, and from remanufactured coal compositions, as well as from other similarly functional fuel compositions. It is further seen that the fuel articles of the invention provide a plurality of advantages and benefits, including ease of use, greater cleanliness, reduced potential for contamination of food being cooked, and less breakage of the product. Substantial deviation from the illustrated embodiments could be made without departing from the spirit of the invention; and so the invention should be limited only as by the claims appended hereto.

We claim:

1. A composite fuel article, comprising:
  (a) a fuel element;
  (b) an outer covering layer of a solid phase igniter material on said fuel element; and
  (c) a spacing zone between said fuel element and said covering layer, said spacing zone being effective to promote generation of heat sufficient to sustain burning in said covering layer upon ignition of said covering layer, without immediate dissipation of the heat into said fuel element, followed by a transfer of heat, which is in excess of that required to sustain burning in said covering layer, from said covering layer to said fuel element.

2. The composite fuel article as in claim 1, said fuel element having concavity.

3. The composite fuel article as in claim 1 or 2, said solid phase igniter material covering a substantial portion of said fuel element.

4. The composite fuel article as in claim 1, said covering layer comprising fibrous material.

5. The composite fuel article as in claim 2, said covering layer comprising fibrous material.

6. The composite fuel article as in claim 1, said covering layer substantially enclosing said fuel element.

7. The composite fuel article as in claim 2, said covering layer comprising fibrous material, at least a portion of the fibers in said fibrous material being capable of bridging said concavity.

8. The composite fuel article as in claim 5, at least a portion of the fibers in said fibrous material bridging said concavity.

9. The composite fuel article as in claim 1 or 2, at least 20% of that portion of said covering layer which overlies said fuel element being spaced from said fuel element.

10. The composite fuel article as in claim 1 or 2, at least 40% of that portion of said covering layer which overlies said fuel element being spaced from said fuel element.

11. The composite fuel article as in claim 4, said fibrous material comprising a combination of long and short fibers.

12. The composite fuel article as in claim 5, said fibrous material comprising a combination of long fiber capable of bridging said concavity and short fibers incapable of bridging said concavity.

13. The composite fuel article as in claim 4 said spacing zone comprising fibers disposed between said fuel element and said covering layer, said covering layer having a higher bulk density than said spacing zone.

14. The composite fuel article as in claim 13 wherein the fibers in said spacing zone are primarily short fibers.

15. The composite fuel article as in claim 1 wherein said covering layer comprises a composition selected from the group consisting of polyesters and nitrocelluloses.

16. The composite fuel article as in claim 6 wherein said covering layer comprises a composition selected from the group consisting of polyesters and nitrocelluloses.

17. The composite fuel article as in claim 4 or 7 wherein said covering layer comprises wax.

18. The composite fuel article as in claim 12 wherein said short fibers are derived from plant or animal sources and said long fiber is derived from mineral source.

19. The composite fuel article as in claim 12 wherein said short fibers are derived from wood.

20. The composite fuel article as in claim 4 wherein said covering layer comprises synthetic polymer.

21. A method of making a charcoal fuel article, said method comprising the steps of:
  (a) fabricating a solid charcoal fuel element;
  (b) fabricating said concurrently positioning, on said fuel element, an outer covering layer of a fibrous material; and
  (c) creating a spacing zone between said fuel element and said covering layer, said spacing zone being effective to promote generation of heat sufficient to sustain burning in said covering layer upon ignition of said covering layer, without immediate dissipation of the heat into said fuel element, followed by transfer of heat, which is in excess of that required to sustain burning in said covering layer, from said covering layer to said fuel element.

22. The method as in claim 21 wherein said fabricating and positioning of said covering layer on said fuel element, including creating said spacing zone, results in the spacing of said covering layer from said fuel element at a plurality of locations about the surface of said fuel element.

23. The method as in claim 21 wherein the combination of said steps (b) and c comprises:
  (1) applying spacing means to the outside surface of said fuel element; and
  (2) applying said covering layer to said fuel element and over said spacing means.

24. The method of making a charcoal fuel article as in claim 23 and including the step of applying wax at said covering layer.

25. A composite fuel article comprising an inner core of a solid shaped fuel element and a covering layer of a material having a density of no more than 10 pounds per cubic foot.

26. The composite fuel article as in claim 25 wherein said covering layer is fibrous.

27. The composite fuel article as in claim 26, said covering layer having a substantially uniform density across the thickness thereof.

28. A method as in claim 21 and including interposing spacing means between said fuel element and said covering layer.

29. A method as in claim 21 wherein said fabricating of said covering layer comprises (i) applying, over said fuel element, fibers long enough to bridge any concavities in the outside surface of said fuel element, and thereby defining a mat of fibers having the general shape and form of the covering layer being formed, ad (ii) applying shorter fibers to said mat of long fibers, to thereby complete fabrication of said covering layer.

30. A method as in claim 23 wherein said fabricating of said covering layer comprises (i) applying, over said fuel element, fibers long enough to bridge any concavities in the outside surface of said fuel element, and thereby defining a mat of fibers having the general shape and form of the covering layer being formed, and (ii) applying shorter fibers to said mat of long fibers, to thereby complete fabrication of said covering layer.

31. A method as in claim 28 wherein said fabricating of said covering layer comprises (i) applying, over said fuel element, fibers long enough to bridge any concavities in the outside surface of said fuel element, and thereby defining a mat of fibers having the general shape and form of the covering layer being formed, and (ii) applying shorter fibers to said mat of long fibers, to thereby complete fabrication of said covering layer.

32. A method as in claim 21 and including applying wax to said covering layer such that said wax does not fill all voids in said fibrous covering layer.

33. A method as in claim 23 and including applying wax to said covering layer such that said wax does not fill all voids in said fibrous covering layer.

34. A method as in claim 28 and including applying wax to said covering layer such that said wax does not fill all voids in said fibrous covering layer.

35. A method as in claim 29 and including applying wax to said covering layer such that said wax does not fill all voids in said fibrous covering layer.

36. A composite fuel article as in claim 1, said spacing zone containing spacing means having a bulk density of less than 10 lbs./ft.$^3$.

37. A composite fuel article as in claim 2, said spacing zone containing spacing means having a bulk density of less than 10 lbs./ft.$^3$.

38. A composiute fuel article as in claim 1, said covering layer comprising fibers, and comprising void spaces between said fibers, and including wax on said fibers, the amount and positioning of said wax being such that said covering layer, including said wax, has void spaces providing gaseous communication between said spacing zone and the outside environment.

39. A composite fuel article as in claim 12, said fibrous covering layer comprising void spaces between ones of said fibers, said covering layer including wax on said fibers, the amount and positioning of said wax being such that said covering layer, including said wax, has void spaces providing gaseous communication between said spacing zone and the outside environment.

40. A composite fuel article as in claim 1, said covering layer comprising fibers, said spacing zone containing a low bulk density spacing means including spacing material comprising elements having spaces therebetween at the portion of said spacing zone proximate asid covering layer, asid covering layer comprising a first layer component of longer fibers adjacent said spacing material and bridging said spacing material elements, and a second layer component of shorter fibers disposed outwardly of said fiber layer component, said covering layer comprisng said first and seocnd layer components.

41. A composite fuel article as in claim 40 wherein the composition of said fibers in said first covering layer component is selected from the group consisting of polyester and nitrocellulose.

* * * * *